Aug. 31, 1937.   E. E. LONGFELLOW   2,091,643
SURGICAL COUNTER TRACTION SPLINT
Filed Sept. 6, 1935
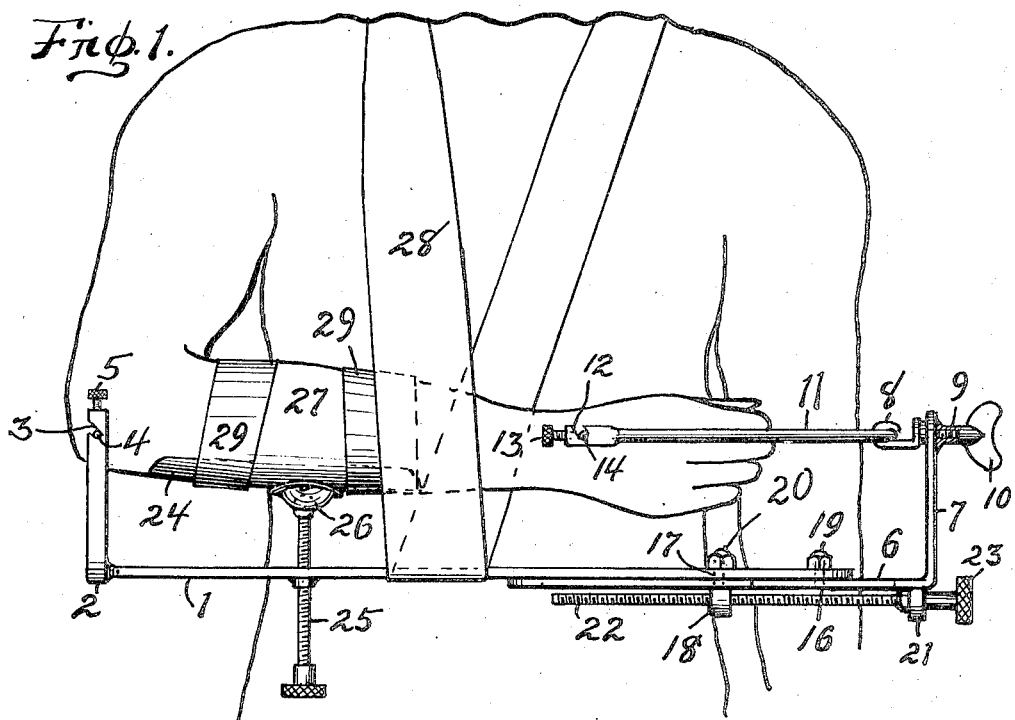
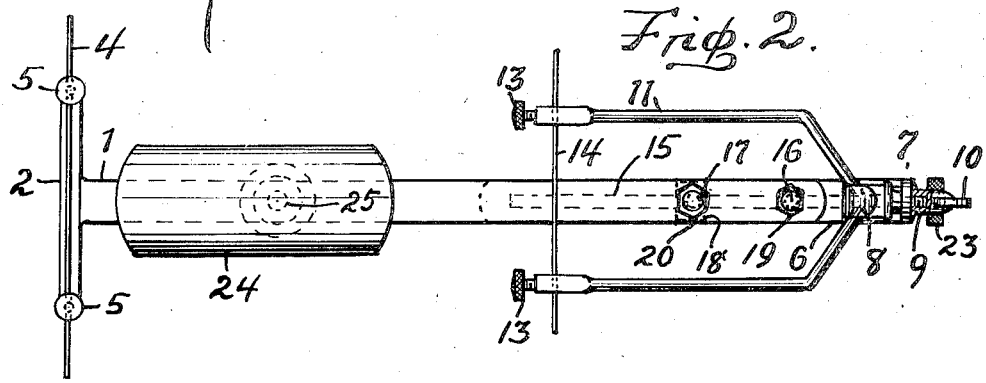
Earl E. Longfellow  INVENTOR.
BY
A. G. Burns  ATTORNEY.

Patented Aug. 31, 1937

2,091,643

UNITED STATES PATENT OFFICE 2,091,643

SURGICAL COUNTERTRACTION SPLINT

Earl E. Longfellow, Warsaw, Ind., assignor to Harry Herschel Leiter, Warsaw, Ind.

Application September 6, 1935, Serial No. 39,419

2 Claims. (Cl. 128—84)

This invention relates to improvements in surgical counter-traction splints adapted for use in connection with skeletal pins or wires and an object thereof is to provide means for reducing fractures, such as of the bones of the forearm, tibia and femur, and to sustain the bone fragments in adjusted position during convalescence. Other objects and advantages of the invention will appear in the following description.

An illustrative embodiment of the invention is shown in the accompanying drawing, in which:—

Fig. 1 is a front elevation of the splint and a fragmentary portion of a patient to which it is applied; and Fig. 2 is a top plan view of the splint projected from Fig. 1.

The illustrative embodiment of the invention consists of a base-bar 1 having at one end thereof an upright U-shaped bracket 2 the arms of which are provided near their upper ends with corresponding notches 3 for the reception of a skeletal pin or wire 4, and also clamp screws 5 for securing said pin or wire firmly in connection with said arms.

In connection with the base-bar 1, at the end thereof opposite the bracket 2, is arranged a sliding extension 6 having an upright standard 7 in the upper end of which is supported an anchor member consisting of a hook 8 provided with a threaded stem 9 that extends loosely through the standard 7 and has thereon a threaded member, preferably a wing nut, 10 to lock the anchor member in adjusted positions with respect to said standard.

A stirrup 11 is mounted in connection with the hook 8, the outer ends of the stirrup having pin or wire-receiving notches 12 and also corresponding clamp-screws 13 whereby to secure in connection with the stirrup a skeletal pin or wire 14.

The extension 6 has therein a longitudinal slot 15 through which loosely extend a guide bolt 16 and also the threaded stem 17 of a pendent lug 18. The bolt and stem are each secured to the base bar 1 and are held in place by corresponding nuts 19 and 20, and prevent lateral turning of the sliding extension 6 relative to the base-bar 1. The extension also has adjacent its outer end a pendent lug 21 in which an adjusting rod 22 has free turning movement and is longitudinally immovable with respect thereto. Said rod has threaded relation with the lug 18 and is provided with an operating knob 23, turning of which causes longitudinal movement of the extension 6 relative to the base-bar 1.

An adjustable arm supporting member is provided consisting of a cradle 24 that is mounted upon an adjusting post 25 that extends through and is threaded in the base-bar. Preferably, the post and cradle are connected by a ball and socket joint 26 so as to permit the cradle to accommodatingly assume a position in conformity with the overlying injured limb 27.

Operation

In use, when the splint is applied in the treatment of a forearm fracture, a skeletal pin or wire 4 is inserted through the olecranon below the tip and spaced from the posterior surface of the bone sufficiently as not to encroach upon the ulnar nerve. Another pin or wire 14 is then inserted through the radius at a point external to the radial vessels. The extending ends of the pin or wire 4 are then placed in the notches 3 and secured in the arms of the bracket 2 by tightening the clamp-screws 5 against the pin or wire. The extending ends of the other pin or wire 14 are then placed in the notches 12 and secured in the ends of the stirrup 11 by tightening the clamp-screws 13 against the pin or wire. The splint preferably is suspended from the body of the patient by a sling 28 that is placed so as to encompass the neck of the patient and base-bar 1. The cradle 24 is then elevated by manipulation of the adjusting post 25 into supporting position with respect to the injured member 27 and is secured to said member preferably by fascia 29 as in ordinary practice. The purpose of the cradle is to prevent sagging of the injured member because of its weight, and through the medium of the sling also opposes downward pressure of the pins or wires on the injured limb.

After the pins or wires 4 and 14 are secured respectively in the bracket 2 and stirrup 11 and the appliance is suspended in the sling, more or less traction and counter-traction is enforced with respect to the engaged parts as desired by manipulating the adjusting rod 22, and also relative rotation of said parts is conveniently effected by turning the anchor member axially upon its stem in the standard 7 to the desired position of adjustment, after which said member is locked in such position by tightening the wing nut 10.

The apparatus thus applied affords exposure for fluoroscopy and radiography and permits inspection, wound treatment, and open operation, when desired.

Preferably, the arms of the bracket 2 are so shaped and spaced sufficiently apart from each other as are also the arms of the stirrup 11 to permit convenient application of plaster encasement after reduction of the fracture.

I claim:—

1. In a surgical splint, a base-bar having at one end thereof an upright U-shaped bracket provided with means to secure transversely therein a skeletal pin or wire; an extension secured to said base-bar longitudinally adjustable relative thereto having an upright standard opposite said bracket; an adjustable anchor and locking means therefor on said standard, a stirrup connected with said anchor provided with means to secure transversely therein a skeletal pin or wire; an adjuster to move said base-bar and extension relatively lengthwise; a limb-supporting member adjustably positioned on said base-bar; and supporting means for the splint.

2. In a surgical splint, a base-bar having at one end thereof a bracket supporting a skeletal pin or wire and at its opposite end an extension longitudinally adjustable thereon provided with a standard oppositely disposed respecting said bracket, a rotatable anchor adjustably secured in said standard, a stirrup connected with said anchor supporting another skeletal pin or wire, an adjuster for moving said extension bodily lengthwise relative to said base-bar, and a limb-supporting member adjustably positioned on said base-bar at a point thereon spaced from said bracket.

EARL E. LONGFELLOW.